(No Model.) 4 Sheets—Sheet 1.

A. SARGEANT, Jr.
CALCULATOR FOR GRAIN, &c.

No. 370,284. Patented Sept. 20, 1887.

Fig. 1.

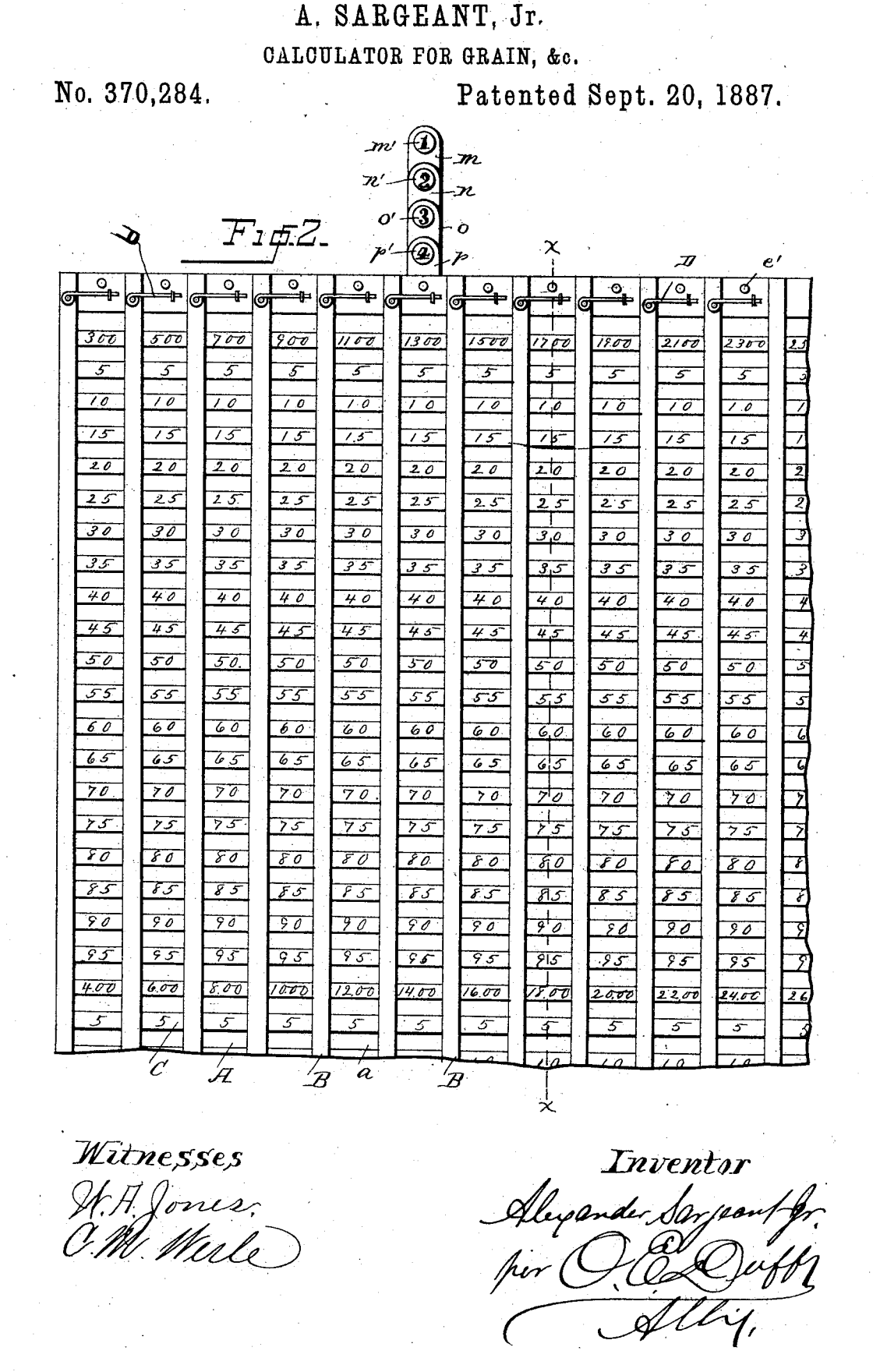

(No Model.) 4 Sheets—Sheet 2.

A. SARGEANT, Jr.
CALCULATOR FOR GRAIN, &c.

No. 370,284. Patented Sept. 20, 1887.

Fig. 2.

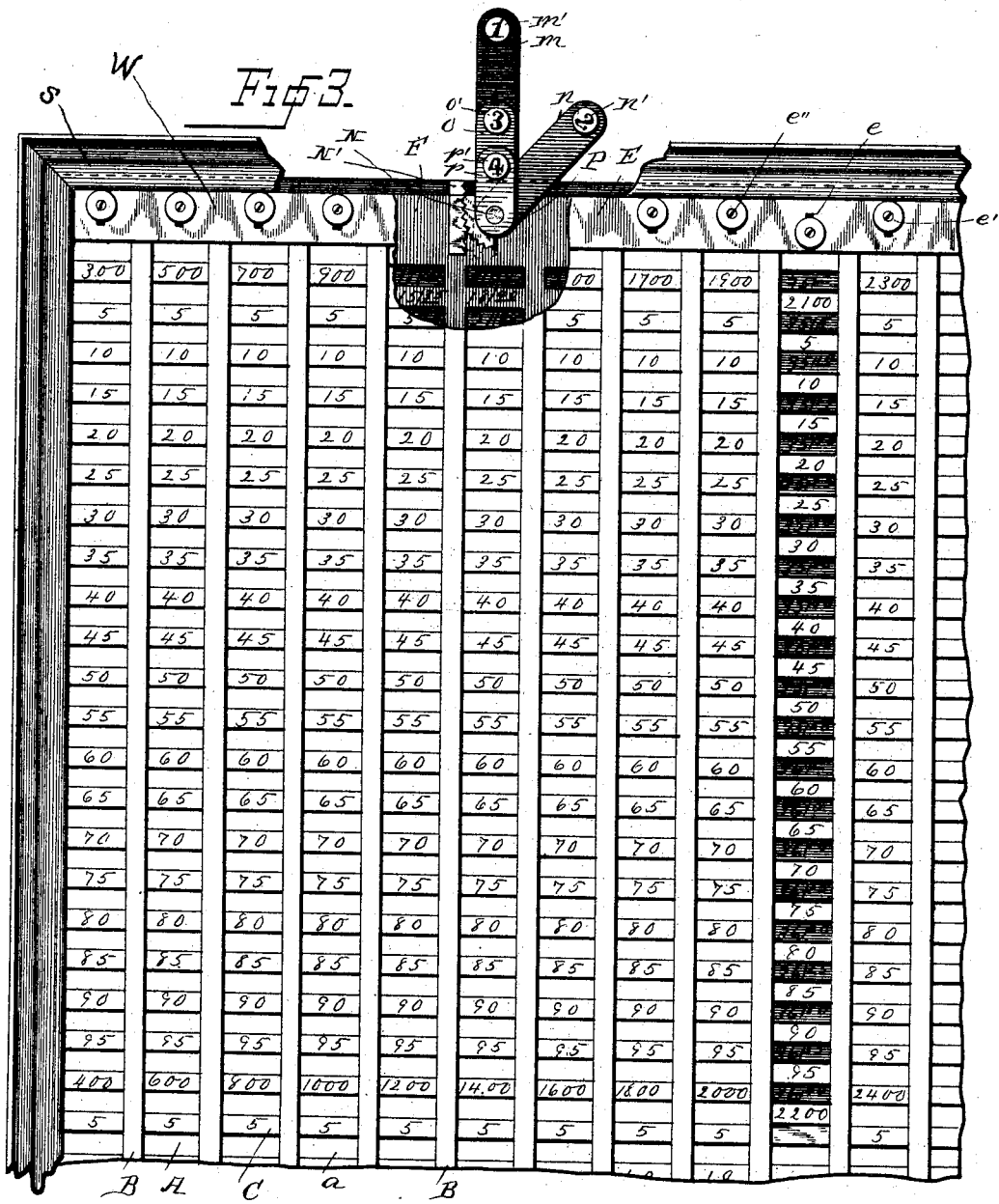

(No Model.) 4 Sheets—Sheet 4.
A. SARGEANT, Jr.
CALCULATOR FOR GRAIN, &c.
No. 370,284. Patented Sept. 20, 1887.
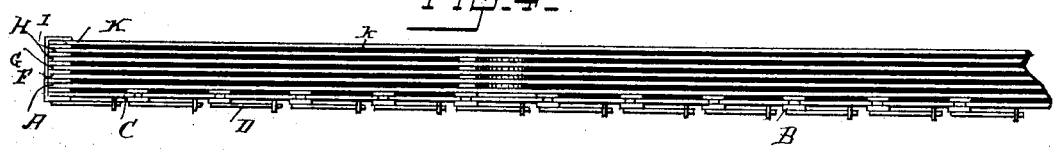
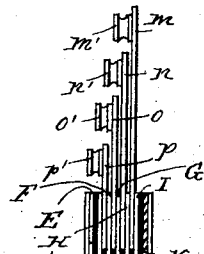
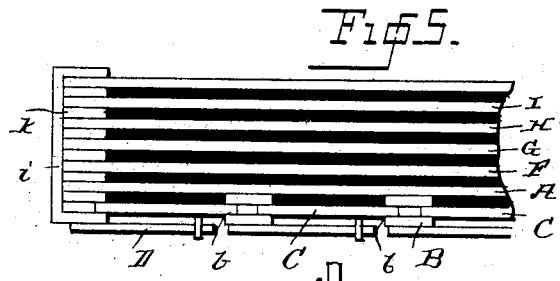
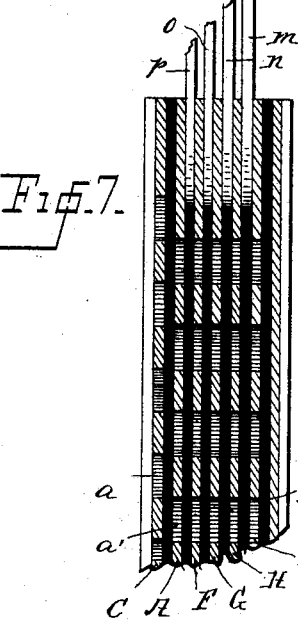
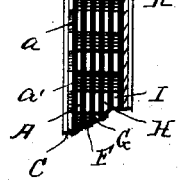
Witnesses
W. H. Jones
C. M. Werle
Inventor
Alexander Sargeant Jr.
per O. E. Duffy
Atty.

UNITED STATES PATENT OFFICE.

ALEXANDER SARGEANT, JR., OF UDALL, KANSAS, ASSIGNOR OF ONE-HALF TO GEO. D. AKERS, OF SAME PLACE.

CALCULATOR FOR GRAIN, &c.

SPECIFICATION forming part of Letters Patent No. 370,284, dated September 20, 1887.

Application filed February 19, 1887. Serial No. 228,225. (No model.)

*To all whom it may concern:*

Be it known that I, ALEXANDER SARGEANT, Jr., of Udall, in the county of Cowley and State of Kansas, have invented certain new and useful Improvements in Calculators and Registers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to a calculating register or indicator for enabling a rapid conversion of one set of values into another—as, for example, of any given weight into the measure in bulk such weight would fill for any given material without the exercise of computation.

The object of the invention is to produce a device which will be capable of rapid manipulation and can be operated by any one able to read numbers, thus enabling a given weight of any article of merchandise to be mechanically converted into the quantity of the same article, as in quarts or bushels, which that weight would represent—as, for example, where it is desired to know how many bushels of grain are in a certain number of hundred-weight. In business operations, where frequent calls are made for such a conversion, expensive clerical assistance is needed to make the necessary calculations, and considerable time is spent in making them.

To this end my invention consists in a register provided with a number of slides, each slide carrying a graduated series of values, the slides being capable of movement with reference to another graduated set of values of a different character, so that the one set may be brought by a simple movement into juxtaposition with the other set, and the one of the first set corresponding to any given one of the second set thus readily indicated.

My invention also embodies features of detail and structure which will be definitely pointed out in the claims annexed to this specification.

In the accompanying drawings, illustrating my invention, Figure 1 is a front elevation of an apparatus embodying my invention, the outer casing being removed. Fig. 2 is a partial front elevation showing the parts to a larger scale. Fig. 3 is a partial front elevation showing the casing and modified shifting devices for the front slides, part being broken away to show how the indicating-plates are shifted. Fig. 4 is a top plan with part broken away. Fig. 5 is a top plan with part broken away, showing the parts to a larger scale. Figs. 6 and 7 are vertical sections taken on line $x\ x$, Fig. 2, showing views on a small and a large scale, respectively.

Within a suitable frame, S, Fig. 3, is mounted the register. The latter is provided with a back plate, K, Fig. 4, and the front plate, A. These plates are held in place by side plates, $i$, (see Fig. 5,) which carry spacing-strips $k$ at suitable distances, to act as guides for a number of indicating-plates, F G H I, placed one between each pair of strips. The register is open above to permit vertical movement of the plates, which will presently be described. To the front plate, A, are secured a number of vertical I-shaped guides, B, Figs. 1, 4, 5, in which slide a series of narrow strips, C. (See Fig. 1.) Springs D are secured to the I-strips, the free end of each spring being pivotally attached to one of the narrow strips C. (See Figs. 1, 4, 5.) Each strip C has a vertical row of rectangular spaces cut out from its body, as shown by the white spaces in Fig. 1. The solid portions between these spaces are numbered. These numbers may be stamped or printed, or may be of solid material and secured to the plates.

An inspection of Fig. 1 will show the arrangement of these numbers. Each strip carries at its top an odd number of hundreds, and each solid part below the hundreds carries one of a series of numbers, increasing from five to ninety-five, with a common difference of five. This common difference could of course be made as small as desired, the number of spaces being correspondingly increased. For practical purposes, however, in indicating commercial weights, for which the instrument is especially designed, an indication accurate within five pounds is near enough.

It will be seen that the odd hundreds, from 300 to 4,500, are arranged in horizontal order at the tops of the successive strips. By providing more strips of course higher numbers could be indicated.

Below the indications 95, I arrange the even hundreds in successive horizontal order on the strips. This disposition enables the eye to catch a given hundred more quickly by reducing the length of the series, the operator knowing that he must look at the top for an odd hundred and below for an even hundred.

Each of the interior plates, F G H I, extends the whole width of the register, and each is provided with rectangular perforations of the same size as the front slides. The front plate, A, has these perforations also. Each of the sliding interior plates has its solid portions numbered with values corresponding in another scale to those on the front slides—as, for example, if the front slides indicate pounds, these rear numbers may indicate bushels. In the normal position of the parts the front slides are held by the springs at their tops, so that their solid portions cover the open spaces in the plate A. When any slide is depressed, an unobstructed view through the spaces of all the plates may be had to the back plate, K. The movement of the interior plates, so as to bring their numbered parts into alignment with the open spaces, is controlled as follows: Each is provided at the top with a short rack, N'. (See Fig. 3.) This rack is engaged with a toothed segment pivoted on a pin, N, secured to the front and back plates, A and K. From each toothed segment a lever extends upward. These levers carry buttons on which are numbers 1 2 3 4, corresponding to the respective plates. Each plate has a vertical slot surrounding pin N and long enough to permit a movement sufficient to lift its numbers into the rectangular openings.

In Fig. 3 I have shown a substitute arrangement for the springs D for operating the slides. In this figure a narrow strip, W, extends across the front of the register. In this strip are vertical slots, one for each slide. A pin, e, on each slide projects through the slots. Each pin carries a button, e', on the outside of the slot. By pushing any particular button down in the slot, the openings in the plate A behind the solid portions of the particular slide operated are exposed.

The operation of the register will now be understood. The front slides cover all the openings in the plate A. No numbers on the interior plates therefore are seen. Those on the front slides only are seen. Suppose the cost of a load of wheat weighing nineteen hundred and fifty pounds were desired, and wheat is quoted at a certain price per bushel. Instead of resorting to the usual calculations, with its liability to error, an operator simply seizes a button—say 2—of the lever gearing with the wheat-indicating plate and moves it to the right. (See Fig. 3.) This movement brings the numbers on the wheat-plate into alignment with the rectangular openings in plate A; but these openings are covered by the front slides. The operator therefore moves the slide having 1,900 at its top down, thus clearing the openings, and in the opening which the solid part numbered 50 clears will be found the indication 32.30 on the wheat-plate for the number of bushels corresponding to nineteen hundred and fifty pounds, thirty-two bushels and thirty pounds remaining. For any other weight the front slide carrying the nearest hundred would be operated. If other material than wheat were being reduced, the plate corresponding to that material would be shifted by the proper lever. These levers are numbered 1, 2, 3, 4, and of course there may be as many as desired. The operator understands that each numbered lever corresponds to a particular plate—as 2 for wheat, 3 for corn, &c. If desired, the names of the materials could be printed on the buttons in lieu of the numbers.

My invention is not limited to the particular uses set forth. It can be adopted wherever there is a fixed relation between two things or values, and the quantity of one varies, it being desired to find the corresponding quantity of the other.

The slides and plates can of course be constructed of any stiff material. Card-board slides could be used with the values printed thereon; but in practice I prefer to make them of metal, as it is more durable.

Having thus described my invention, what I claim as new, and desire to secure by Letters Patent, is—

1. In a calculating device, a frame, a number of sliding plates supported behind one another in said frame, having openings therein and numbers on the plates between the openings, a sliding plate on the front of the frame having similar openings, its solid parts normally covering the openings in the plates behind it, and means for shifting the solid parts in the rear plates into alignment with the openings and the solid parts of the front plate away from the openings, as set forth.

2. In a calculating device, the front plate having a vertical and a horizontal series of openings, a series of slides in front of said plate, guides for said slides, said slides being provided with openings similar to those of the front plate, springs normally holding the slides, so as to cover the plate-openings, a number of sliding rear plates having openings similar to those of the front plate, and means for shifting the openings of all or any of the plates into alignment, the front slides being marked with numbers representing one series of values and the back plates being marked with numbers representing another series of values.

3. In a calculating device, the combination, with a frame having side guides, plates having a horizontal and a vertical series of openings movable in said guides, the solid parts between the openings being marked with numbers, means for raising or lowering any plate so as to shift its numbers into or out of alignment with the openings in the other plates, guides in front of the frame, slides movable in said guides having similar openings, and the solid parts being marked with numbers, whereby the numbers on any rear plate can be brought into view in juxtaposition with the numbers on the front slides, as set forth.

4. In a calculator, the combination of a plate, A, having vertical and horizontal series of openings, slides C, having similar openings, the solid parts between the openings having weight-indicating numbers, and sliding plates F G H, having similar openings, the solid parts between these openings having measure-indicating numbers, each plate representing a different material, whereby the values on any plate can be shifted into alignment with the openings of the plates in front of it and seen in juxtaposition with the numbers on the slides.

In testimony that I claim the foregoing as my own I affix my signature in presence of two witnesses.

ALEXANDER SARGEANT, JR.

Witnesses:
   GEO. H. NORMAN,
   WM. B. NORMAN.